United States Patent [19]
Gautchier et al.

[11] Patent Number: 5,208,060
[45] Date of Patent: May 4, 1993

[54] REDUCED FAT PIES AND METHODS OF PREPARING THE PIES

[75] Inventors: Peter M. Gautchier, Mc Henry; John D. Chapman, Naperville, both of Ill.

[73] Assignee: Van den Bergh Foods Co., Division of Conopco, Inc., Lisle, Ill.

[21] Appl. No.: 845,580

[22] Filed: Mar. 4, 1992

[51] Int. Cl.$^5$ .................. A21D 10/00; A23D 9/00
[52] U.S. Cl. ...................... 426/556; 426/94; 426/601; 426/602; 426/604; 426/607
[58] Field of Search .............. 426/556, 94, 601, 602, 426/604, 607

[56] References Cited

U.S. PATENT DOCUMENTS

| | | | |
|---|---|---|---|
| 3,255,016 | 6/1966 | Parker | 426/62 |
| 3,384,494 | 5/1968 | Colby et al. | 426/556 |
| 3,486,908 | 12/1969 | Bedenk et al. | 426/556 |
| 3,561,975 | 2/1971 | Luebering et al. | 426/556 |
| 3,615,682 | 10/1971 | La Baw et al. | 426/556 |
| 3,985,911 | 10/1976 | Kriz et al. | 426/602 |
| 4,199,608 | 4/1980 | Gilmore et al. | 426/570 |
| 4,351,852 | 9/1982 | Rule et al. | 426/554 |
| 4,722,849 | 2/1988 | Dartey et al. | 426/94 |
| 4,840,803 | 6/1989 | Polizzano | 426/94 |
| 4,891,233 | 1/1990 | Belanger et al. | 426/556 |
| 4,894,246 | 1/1990 | Dartey et al. | 426/94 |
| 5,023,099 | 6/1991 | Boehm | 426/549 |
| 5,039,544 | 8/1991 | Lansbergen et al. | 426/556 |

OTHER PUBLICATIONS

Van den Bergh Foods Inc., "Minitart Crust", Jun. 1, 1991.
Sunette ®, "Apple Tart Formulation" Brochure, 1991.
A. E. Staley Manufacturing Co., "3.5% Fat Danish", Brochure NPST 14, (198250), 1991.
Van den Bergh Foods Inc., Dur-Lo ® Product Data Brochure, FIG. 212D, Jul. 1991.
Van den Bergh Foods Inc., Optima 23B ® Product Data Sheet IND-258, Jun. 1989.
Van den Bergh Foods Inc., Kaomel ® Product Data Sheet IND-217J, Nov. 1989.
Van den Bergh Foods Inc., Recipe B, Dec. 2, 1985.

*Primary Examiner*—Jeanette Hunter
*Assistant Examiner*—Mary S. Mims
*Attorney, Agent, or Firm*—Rimma Mitelman

[57] ABSTRACT

A pie product (pie dough or pie crust) containing a reduced amount of fat. The pie product contains a hard vegetable fat, and a softer fat. A method of preparing the pie product includes the steps of:
(a) preparing a cohesive mass comprising flour, a first-stage fat, and water wherein the first-stage fat is a vegetable fat having a Wiley melting point below 110° F. and a Solid Fat Index at 70° F. and less than or equal to 49, preferably in the range of 20–49; and
(b) adding a second stage fat to the mass obtained in step (b) in order to obtain a dough, wherein the second-stage fat is a vegetable fat having a Wiley melting point below 115° F. and a Solid Fat Index at 70° F. in the range of 20 to 73 and wherein fat B is added in a molten state.

19 Claims, No Drawings

REDUCED FAT PIES AND METHODS OF PREPARING THE PIES

FIELD OF THE INVENTION

The invention relates to reduced fat pie doughs, pies, and pie crusts and processes of producing the same.

BACKGROUND OF THE INVENTION

Pie dough is typically prepared by a two-stage procedure. In the first stage, shortening and flour are mixed together. In the second stage, water and optional dry ingredients are added with additional mixing. The extra flaky crust is sometimes obtained partially by very light mixing and partially by a "rolling-in" method similar to that used for making a puff pastry.

One of the methods for making puff pastry is to form a dough ball from ingredients including fat, flour, salt and water; and then a large quantity of roll-in fat is "blitzed" into the dough ball. "Blitzing" means taking pieces of fat, distributing pieces of fat in the dough. When subsequently, dough is rolled out, layers of fat and dough result.

Colby et al. (U.S. Pat. No. 3,384,494) disclose a dry free-flowing full-fat pastry crust mix wherein a shortening composition having an SCI value of about 12 to 17 at 70° F is firmed, formed into pieces, and mixed with flour to produce a mix comprising discrete lumps of shortening.

Kriz et al. (U.S. Pat. No. 3,985,911) disclose roll-in pastry shortening having a Wiley melting point in the range of about 110° to 120° F. and an SFI profile as follows:

| Temperature °F. | SFI |
| --- | --- |
| 50° | 28 to 40 |
| 70° | 24 to 37 |
| 80° | 22 to 34 |
| 92° | 16 to 28 |
| 100° | 13 to 22 |
| 110° | 5 to 16 |

Parker et al. (U.S. Pat. No. 3,255,016) disclose a roll-in pastry mix which includes particles of a fat having a melting point not less than about 110° F. and having solid fat indices as follows:

| Temperature °F. | Minimum S.F.I. | Maximum S.F.I. |
| --- | --- | --- |
| 50° | 23 | 43 |
| 70° | 18 | 34 |
| 80° | 17 | 33 |
| 92° | 15 | 28 |
| 100° | 12 | 24 |
| 110° | 6 | 17 |

Polizzano (U.S. Pat. No. 4,840,803) discloses multi-textured cookies containing at least about 12% of a hard vegetable fat having a solid fat index of at least 40% at 70° F., to aid in retaining a firm texture upon storage. One of the exemplified fats (Snak-KoteR) has a melting point of 103°-107° F., another exemplified fat (K.L.X.R) has a melting point of 124°-130° F.

Boehm (U.S. Pat. No. 5,023,099) discloses the use of a shortening or fat having a solid fat index of from about 18 to 31 at 50° F., 13-18 at 70° F. and less than 13 at 80° F. and which is essentially completely liquid at 100° F. for improving bloom resistance in shelf-stable cookies. Typical amounts range from 20% by weight to about 80% by weight based upon the weight of the flour. Cookies made with a fat having a solid fat index of less than 13 at 80° F. and which is essentially liquid at about 100° F. are also disclosed by U.S. Pat. Nos. 4,722,849 and 4,894,246.

Rule et al. (U.S. Pat. No. 4,351,852) disclose cake formulations, the fat content of which may be reduced by at least about 50% and which contain a mono- and diglyceride emulsifier, a major constituent of which (38%–48%) is diglyceride. The cake may also contain a di- or triglyceride vehicle, e.g. a partially hydrogenated vegetable oil having a Wiley melting point of 111°-119° F. and an SFI 25 maximum at 70° F., 19 maximum at 92° F. and 10 min. at 104° F. With regard to the Rule et al. disclosure, it should be noted that, although cakes and pies are both bakery products, the physical characteristics desired in the two products are very different (e.g., cakes do not need to be flaky and pies do not need to have a high specific volume), and the preparation of the two products requires different steps and formulations (i.e. batter is needed to make a cake, whereas dough is needed to make a pie). The principles and skills required in formulating the two products are so distinct, that it is difficult to extend the teachings in one of the arts to the other.

The fat content of pie crusts typically is at least about 30%. Although attempts have been made at reducing the fat content in pie products, they have not been entirely satisfactory. The most important pie crust properties affected by the fat include tenderness (as opposed to chewiness or toughness) and flakiness (as opposed to mealiness). It is desirable that the pie crust be flaky and have a tender texture. Pie crusts which are watery, tough, bread-like, or mealy are considered unappetizing by the consumer and are thus commercially unacceptable. In light of the rising consumer demand for food products of a reduced fat content, if the fat content of a pie could be lowered without the decrease in functional properties of the pie, this could be of significant help to those seeking to reduce their calorie consumption.

Accordingly, it is an object of the present invention to provide a pie product (i.e., pie doughs and pie crusts) having a reduced level of total fat.

It is another object of the invention to provide a pie product having no more than 15% fat.

It is still another object of the invention to provide a fat composition for making a pie product which composition makes possible to attain reduced fat pie products.

It is still another object of the invention to provide an improved method for manufacturing pies.

It is yet another object of the invention to provide a method of making a reduced fat pie product.

These and other objects of the invention will become more apparent from the detailed description and examples which follow.

SUMMARY OF THE INVENTION

The above objects are attained by the present invention which includes a pie product containing two specific fats, fat A and fat B, and an emulsifier. Both fats have Wiley melting points below about 110° F., but differ with respect to solids content, i.e. fat B is a hard vegetable fat and fat A is softer than fat B. Specifically, fat A has a solid fat index at 70° F. in the range of from 20 to 49, preferably in the range from 32 to 42 and fat B has a solid fat index at 70° F. in the range of from 50 to 73, preferably in the range of from 54 to 69.

The present invention is based, in part, on the discovery that a pie crust of reduced fat content and of optimum quality, with respect to eating quality, structure and appearance, may be attained by making a pie crust with a fat system which includes fat A, fat B, and an emulsifier, yet the fat content in the pie product may be reduced by at least about 50%.

The present invention also includes a method for making pie products, including reduced fat pie products, the method including the steps of:
(a) preparing a cohesive mass comprising flour, a first-stage fat, and water wherein the first-stage fat is a vegetable fat having a Wiley melting point below 110° F. and a Solid Fat Index at 70° F. of less than or equal to 49, preferably in the range of 20-49; and
(b) adding a second stage fat to the mass obtained in step (b) in order to obtain a dough, wherein the second-stage fat is a vegetable fat having a Wiley melting point below 115° F. and a Solid Fat Index at 70° F. in the range of 20 to 73 and wherein fat B is added in a molten state.

In order to attain additional benefits associated with the inclusion of an emulsifier into the pie product, the blend in step (a) preferably includes an emulsifier in addition to the first-stage fat. For convenience, and in order to improve the dispersion of the emulsifier in the dough, the emulsifier and the first-stage fat may be preblended and added to flour as a blend. The blend may be plastic or molten.

The term "pie product" as used herein includes pie doughs, pie crusts, pie shells. The pie product may be used for making filled pies, pot pies, tarts, and coatings or breadings for meat, vegetable and fruit products.

DETAILED DESCRIPTION OF THE INVENTION

Pie products according to the present invention include two specifically selected vegetable fats, fat A and fat B. According to the present invention, fat A has a Wiley melting point below about 110° F. and a solid fat index at 70° F. in the range of from 20 to 49; fat B has a Wiley melting point below about 110° F. and a solid fat index at 70° F. of from 50 to 73.

The present invention can be practiced by using, as Fat B, a hard vegetable fat which satisfies the above melting point and SFI profile requirements for fat B. Suitable hard vegetable fats include but are not limited to a partially hydrogenated soybean and/or cottonseed oil, such as Durlite (SFI: 69 min. at 50° F., 59 min. at 70° F., 50 min. at 80° F., 20 min. at 92° F., 8 max. at 100° F., Wiley melting point 98°-102° F.), Snac-Kote ® (drop point 103°-107° F., SFI: 59 min. at 50° F., 50 min. at 70° F., 44 min. at 80° F., 9 min. at 92° F. and 6 max. at 100° F.), SnacKote XTRR,(SFI: 60 min. at 50° F., 50 min. at 70° F., 42 min. at 80° F., 20 min. at 92° F., 8 max. at 100° F., Mettler Drop Point 39°-41° C.), Duromel ® (SFI: 56 min. at 50° F., 43 min. at 70° F., 36 min. at 80° F., 16 min. at 92° F., 8 max. at 100° F., Wiley melting point 101°-105° F.), (Van den Bergh Foods Co.), and the like. Durlite F ® is especially preferred due to its sharp melting point at about 100° F.

Suitable fats which may be employed as fat A are vegetable fats which satisfy the SFI and melting point requirements required for fat A. Fats which are typically known as hard fats are not suitable for use as fat A.

An example of a suitable vegetable fat is Optima 23B ® (Van den Bergh Foods Co.) (melting point=94°-98° F.; SFI: 50 min. at 50° F., 35 min. at 70° F., 22 min. at 80° F., 10 max. at 92° F., and 1 max. at 100° F.).

It has been found, as part of the present invention, that best results are obtained with respect to eating quality (no fat coating is left in the mouth) when fats A and B have steep melting curve profiles. This is surprising and unexpected since traditional fats and shortenings (e.g., lard) included in pies have a flat melting curve profile.

Further describing fats A and B, the preferred detailed SFI profiles of the fats are as follows:

|  | SOLID FAT INDEX | | | | |
| --- | --- | --- | --- | --- | --- |
|  | 50° F. | 70° F. | 80° F. | 92° F. | 100° F. |
| FAT A: | 42-62 | 20-49 | 15-39 | 5-18 | 5 max. |
| Preferred | 45-59 | 30-44 | 17-31 | 5-19 | 5 max. |
| Most Preferred | 47-57 | 32-42 | 19-29 | 7-17 | 3 max. |
| Optimum | 50-54 | 35-39 | 22-26 | 10-14 | 1 max. |
| FAT B: | 62-82 | 50-73 | 39-65 | 15-35 | 0-10 |
| Preferred | 64-80 | 54-69 | 47-61 | 18-33 | 0-10 |
| Most Preferred | 66-78 | 56-67 | 49-59 | 19-31 | 0-8 |
| Optimum | 69-75 | 59-65 | 52-57 | 22-29 | 2-5 |

The preferred melting point ranges for fats A and B are from about 90° F. to about 105° F., most preferably from about 94° F. to about 105° F.

Preferably, fat A and fat B have a steep SFI profile and melt at about 100° F.

A further essential ingredient of the reduced fat pie product according to the present invention is an emulsifier, typically included in an amount ranging from about 0.5% to about 10%. Preferably, in order to optimize tenderness from about 2% to about 5% are employed.

A preferred emulsifier is a partial glycerol ester emulsifier. Preferably, the major constituent of the emulsifier is diglyceride, which is preferably present in an amount of greater than 35%, preferably in the range of from 38 to 48%. The triglyceride content is less than the amount of monoglyceride and diglyceride combined but may be equal to the diglyceride content. The emulsifier may contain small amounts of free glycerine and free fatty acids (generally less than 1%). Preferably, the partial glycerol ester emulsifier has about 10% to about 30% monoglyceride, about 38% to about 48% diglyceride, and about 23% to about 46% triglyceride. One example of the preferred emulsifier is Dur-Lo ® (Van den Bergh Foods Co.). Dur-lo ® has an I.V. of 66-70 and a capillary melting point of 113°-120° F. Other suitable emulsifiers include for example Durem-114K$^R$ (diglyceride content approximately 43.0%, melting point range 110°-120° F., IV 65-75) and Durem-204KR (diglyceride content approximately 36%, melting point 114°-121° F., IV 65-75). Most preferred emulsifier is Dur-Lo ®.

The pie product preferably includes an enzyme or an amino acid in order to reduce shrinking and to further increase tenderness of the product. The enzyme is selected from the group consisting of proteolytic food grade enzymes. The enzyme is typically included in the amount of from 0.01% to .1%, preferably in the amount of from 0.04% to 0.08%. The amino acid is selected from the group consisting of approved food grade amino acids which interact with flour proteins to weaken their structure and is typically included in the amount of from about 0.005% to about 0.01%. The preferred amino acid is L-cysteine.

The level of flour and water will be dependent on the final fat % desired in the pie product. When the pie product contains from 15 to 20% fat, it typically includes from about 45% to about 60%, preferably from about 51% to about 54% of flour, and from 19% to 22% water. The preferred flour is pastry flour.

The reduced fat pie according to the invention preferably includes a bulking agent, in order to replace the mass of the fat removed from the formulation and to immobilize formula moisture. Sugar or fructose are suitable bulking agents, particularly in fruit pies. Examples of other bulking agents include but are not limited to non fat dry milk, corn syrup solids, whey protein concentrate, maltodextrin, cellulose fiber, or mixtures thereof. The bulking agent is typically used in an amount of from 5% to 20%, preferably from 10% to 15%.

The reduced fat pie product according to the present invention may contain other ingredients such as salt, flavorants, colorants, and preservatives.

Various food fillings for the reduced fat pie of the present invention include meat, fowl, fruit, savory dairy products, pasta or vegetables. Suitable fillings may be obtained from Baker Source ® collection (Van den Bergh Foods Co.).

The reduced fat pie products according to the present invention contain less than or equal to 25% fat, preferably 15% fat or less. Preferably, the pie products contain at least 10% fat.

Fat A, fat B and the emulsifier are typically employed in amounts of from 1% to 10% of fat A, from about 2% to about 15% of fat B and from about 0.5% to 10% of the emulsifier. The preferred amounts are from about 2.5 to about 4.5% of fat A, from about 4% to about 8% of fat B and from about 2% to about 4% of the emulsifier.

The reduced fat pie products of the present invention are prepared as follows: in the first stage, a cohesive mass is formed from dry ingredients, fat A, an emulsifier and water and, in the second stage, fat B is distributed in the resulting mass in order to obtain the dough. Fat B may be incorporated into the dough in the form of flakes. To avoid the processing problems and ripping of the dough that may be caused by hard pieces of fat B, it is preferred that fat B is added in the molten form.

The latter method, which utilizes molten fat in the second stage, is another aspect of the present invention; the method is suitable for the preparation of high fat and reduced fat pies, including the reduced fat pies of the present invention, whenever one or more fats are added at separate stages. According to the inventive method, a cohesive mass is prepared from dry ingredients, a first stage fat, and water. The first stage fat is a vegetable fat having a Wiley melting point below 110° F. and a solid fat index at 70° F. of less than or equal to 49, preferably 20-49.

Preferably, dry ingredients are blended first with a first-stage fat, and then water is added. The blending is typically carried out for about 10 min. in a Hobart Planetary mixer (speed 1 setting) with wire whip. Other mixers capable of producing a uniform dispersion of the first-stage fat over the dry ingredients are suitable (e.g., a horizontal mixer).

The second-stage fat, which has been premelted, is then added to the resulting cohesive mass. It is important not to overmix the dough when the second-stage fat is incorporated: mixing should be continued just long enough to incorporate the second stage fat into the dough, and not to leave any fat on the sides of the bowl. The second stage fat is a vegetable fat having a Wiley melting point below 115° F. and a Solid Fat Index at 70° F. in the range of 20 to 73. According to the inventive process, the same fat may be employed as a first stage fat and a second stage fat: the flakiness of a pie is improved if molten fat is added as a separate step of the process. Best results are obtained, however, particularly with regard to reduced fat pies, when the first stage fat is fat A and the second stage fat is fat B, in the amounts as described above for reduced fat pie formulations. Further, according to the inventive method it is preferred that an emulsifier is added. It has been found advantageous, for convenience sake and in order to improve an even distribution of the emulsifier in the cohesive mass without overmixing, to preblend fat A and the emulsifier. The preferred emulsifiers and the amounts of the emulsifiers, fat A, and fat B have been described above.

The inventive method is particularly suitable for preparation of pies, which like the reduced fat pies of the present invention, employ hard fat as the second-stage fat.

The resulting dough is rested, (e.g., 15–20 minutes), rolled out, formed into pies of the desired size. Preferably, the dough is rolled out at room temperature. The pie dough is capable of being refrigerated, frozen, and stored.

The pies are baked at the same temperature and for the same amount of time as full-fat pies.

The reduced fat pie products according to the present invention contain less than 25% fat, preferably 15% fat or less. Preferably, the pie products contain at least 10% fat.

All weight %, unless indicated otherwise, are by weight % of the dough.

The following specific examples further illustrate the invention, but the invention is not limited thereto.

EXAMPLES 1–4

Various fats, as indicated in Table 1, were evaluated in reduced fat pie dough recipes. The overall eating quality, structure, and appearance of empty pie shells were evaluated by a 3–5 member panel. All pie doughs contained the following ingredients:

| Water | 20.93% |
| --- | --- |
| Pastry Flour | 52.53% |
| Fat A[1] | 4.00% |
| Emulsifier[2] | 3.35% |
| Fat (Melted) (Table I) | 7.00% |
| Salt | 0.98% |
| Non Fat Dry Milk | 1.97% |
| Protease | 0.058% |
| Whey Protein Concentrate | 2.58% |
| 5DE Maltodextrin | 6.60% |

[1] Optima 23B[R]
[2] Available as Dur-Lo[R] from Van den Bergh Foods Co.

All pie doughs contained a total of 15.92% fat. The batch weight in each case was 1,500 g.

The following procedure was employed:

All dry ingredients were preblended with a wire whip. The emulsifier and fat A were then finely dispersed using a wire whip in a Hobart mixer (speed 1). Using a paddle on low speed setting 1 on the Hobart mixer), water was added slowly and mixing continued just until the dough came together. Fat B was trickled in over the course of 20–30 seconds (the mixer was alternately turned on and off during the addition). 9 inch frozen pie shells were baked at 425° F. for about 13 minutes.

TABLE I

| Example No. | Fat | M.P. (°F.) | Solid Fat Index | | |
|---|---|---|---|---|---|
| | | | 50° | 70° | 92° |
| 1 | Dur-liteF$^R$ | 98–102 | 69 min. | 59 min. | 20 min. |
| 2 | Code 321$^R$ | 95–99 | 33–43 min. | 22–25 min. | 3–8 min. |
| 3 | Kao-rich$^R$ | 124–130 | 80 min. | 80 min. | 80 min. |
| 4* | Optima 23-B$^R$ | 94–98 | 50 min. | 35 min. | 10 max. |

*Dough included 3.35% Dur-lo$^R$ and 11.00% Optima 23B$^R$

Although pie crusts could be produced in Examples 2 and 4, overall eating quality, structure, (tenderness, clean melt-away) (layering, flakiness) and appearance was optimum when fat B was included (Example 1). Example 1, which included fat B within the scope of the claims, has optimum flakiness. Example 3 was too sticky to roll out in preparing the pie.

EXAMPLE 5

Example 1 was repeated, except that the emulsifier and fat A were premelted and added as a melt. A tender and flaky pie crust was obtained.

EXAMPLE 6

Example 1 was repeated except that instead of Dur, Durem 114 ® was employed. The resulting pie was flaky, but with a softer texture.

EXAMPLE 7

A pie crust was prepared as in Example 1, except that fat A was not included, and the emulsifier was employed at a level of 7.0%. The pie shells obtained were bread-like (not flaky).

The example demonstrates the criticality of including fat A into the dough.

EXAMPLE 8

Pie crusts were prepared including various levels (as indicated below) of an emulsifier, fat A, and fat B.

| | weight % | | |
|---|---|---|---|
| Fat A$^1$ | 5 | 4 | 4 |
| Emulsifier$^2$ | 6.7 | 3.35 | 4 |
| Fat B$^3$ | 3.2 | 7 | 7 |

$^1$Optima 23B$^R$
$^2$Dur-Lo$^R$
$^3$Available as DurliteF$^R$ from Van den Bergh Foods Co.

All pie crusts were flaky.

EXAMPLE 9

A reduced fat pie crust containing less than 15% fat was prepared: (Pie I)

| Ingredients | wt % |
|---|---|
| Water | 20.97% |
| Pastry Flour | 52.5% |
| Fat A$^1$ | 3.51% |
| Emulsifier$^2$ | 2.94% |
| Fat B$^3$ | 6.15% |
| Salt | 0.98% |
| Vegetable Fiber$^4$ | 1.700% |
| Non Fat Dry Milk | 1.97% |
| Protease (90,000 npu/g) | 0.058% |
| Whey Protein Concentrate | 2.58% |
| 5DE Maltodextrin | 6.6% |

$^1$Optima 23B$^R$
$^2$Dur-Lo$^R$
$^3$Available as DurliteF$^R$ from Van den Bergh Foods Co.
$^4$Just Fiber CS 35H (Van den Bergh Foods Co.)

The same procedure was employed as in Example 1.
The pie was compared with the pie produced from a commercially available recipe (13.4% fat.) (Pie 2)

| | |
|---|---|
| Water | 23.1% |
| Pastry Flour | 55.07% |
| Fibrim 1450 | 2.9% |
| Shortening$^1$ | 4.35% |
| Salt | 1.45% |
| Dur-Lo | 7.25% |
| Maltodextrin | 4.35% |
| Non Fat Dry Milk | 0.29% |

Creamtex$^R$ (Van den Bergh Foods Co.)

The pie was prepared according to the procedure in a recipe: all dry ingredients were mixed with fat. The dough was rolled out. The frozen pie was baked at 400° F. for 50 minutes. The resulting pie crust was not flaky, and had an inferior overall eating quality than Pie I.

EXAMPLE 10

Example 1 was repeated except that no emulsifier was included and fat A was employed at 7 wt. % The pie crust was layered, soft, and chewy.

This example illustrates the criticality of including an emulsifier, in addition to fat A and fat B, in order to obtain a tender, crisp texture as opposed to soft and chewy texture.

The ingredients included in the Examples, unless already mentioned in the specification or examples, may be obtained from the following suppliers:

| Ingredient | Tradename | Supplier |
|---|---|---|
| Soy Fiber | Fibrim 1450$^R$ | Protein Technologies |
| Maltodextrin 5DE | Stardri 5$^R$ | Staley |
| Bacterial Neutral Protease 90K | | Quest |
| L-cysteine hydrochloride anhydrous | | Austin Chemical |
| Whey Protein Concentrate | Calpro 75$^R$ | Calpro Ingredients |
| Flour | Flatex$^R$ | L. Warp & Sons Inc. |
| Non Fat Dry Milk | | Land O Lakes |

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

What is claimed is:
1. A pie product containing less than or equal to 25% fat and comprising
   (a) from about 1 to about 10% of fat A, wherein fat A is a vegetable fat having a Wiley melting point below 110° F. and a Solid Fat Index at 70° F. in the range of from 20 to 49;
(b) from about 2 to about 15% of fat B, wherein fat B is a hard vegetable fat having a Wiley melting point below 110° F. and a Solid Fat Index at 70° F. in the range of from 50 to 73; and
(c) from about 0.5 to about 10% of an emulsifier.

2. The product of claim 1, wherein fat A has a Solid Fat Index at 50° F. in the range of from 42 to 62, and a Solid Fat Index at 92° F. in the range of from 5 to 18.

3. The product of claim 1, wherein fat A has a melting point at about 100° F.

4. The product of claim 1, wherein fat B has a Solid Fat Index at 50° F. of in the range of 62 to 82, and a Solid Fat Index at 92° F. in the range of from 15 to 35.

5. The product of claim 1, wherein fat B has a melting point at about 100° F.

6. The product of claim 1 wherein the product comprises from about 2.5 to about 4.5% of fat A and from about 4 to about 8% of fat B and from about 2% to about 4% of the emulsifier.

7. The product of claim 1 wherein fat A has a solid fat index at 50° F. in the range of from 47 to 57, a solid fat index at 70° F. in the rang of from 32 to 42 and the solid fat index at 92° F. in the range of from 7 to 17.

8. The product of claim 1 wherein fat B has a solid fat index at 50° F. in the range of from 66 to 78, a solid fat index at 70° F. in the range of from 56 to 67, and the solid fat index at 92° F. in the range of from 19 to 31.

9. The product of claim 1 containing fat at a level not greater than 15%.

10. The product of claim 1, wherein the emulsifier is a partial glycerol ester emulsifier.

11. The product of claim 1, wherein the emulsifier contains at least 35% of diglycerides.

12. The product of claim 1, further comprising from about 0.01% to about 0.1% of protease.

13. The product of claim 1 further comprising from about 0.005% to about 0.01% of an amino acid.

14. The product of claim 13, wherein the aminoacid is L-cysteine.

15. A method of preparing a pie product, the method comprising:
(a) preparing a cohesive mass comprising flour, a first-stage fat, and water wherein the first-stage fat is a vegetable fat having a Wiley melting point below 110° F. and a Solid Fat Index at 70° F. of less than or equal to 49; and
(b) mixing a second stage fat into the mass obtained in step (a) in order to obtain a dough, wherein the second-stage fat is a vegetable fat having a Wiley melting point below 115° F. and a Solid Fat Index at 70° F. in the range of 20 to 73 and wherein the second-stage fat is added in a molten state.

16. The method of claim 15 wherein the pie product contains less than or equal to 25% fat.

17. The method of claim 15 wherein the cohesive mass in step (a) further comprises an emulsifier.

18. The method of claim 15 wherein wherein the cohesive mass in step (a comprises from about 1% to about 10% of the first-stage fat and from about 0.5% to about 10% of the emulsifier.

19. The method of claim 17 wherein the method comprises preparing a blend comprising the emulsifier and fat A and adding the resulting blend to the blend prepared in step (a) of the method.

* * * * *